United States Patent
Mizoue et al.

(10) Patent No.: US 8,039,980 B2
(45) Date of Patent: Oct. 18, 2011

(54) WIND TURBINE GENERATOR AND METHOD OF CONTROLLING THE SAME

(75) Inventors: Taketo Mizoue, Tokyo (JP); Mitsuya Baba, Tokyo (JP); Yoshiyuki Hayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/600,817

(22) PCT Filed: Jun. 26, 2009

(86) PCT No.: PCT/JP2009/061727
§ 371 (c)(1),
(2), (4) Date: Nov. 8, 2010

(87) PCT Pub. No.: WO2010/150399
PCT Pub. Date: Dec. 29, 2010

(65) Prior Publication Data
US 2011/0042950 A1    Feb. 24, 2011

(51) Int. Cl.
*F03D 7/04* (2006.01)
(52) U.S. Cl. .............. 290/44; 290/55; 416/16
(58) Field of Classification Search .......... 290/44, 290/55, 43, 54; 416/39, 61, 1
See application file for complete search history.

(56) References Cited

U.S. PATENT DOCUMENTS

| | | | | |
|---|---|---|---|---|
| 7,086,834 B2 * | 8/2006 | LeMieux | ........................ | 416/1 |
| 7,217,091 B2 * | 5/2007 | LeMieux | ........................ | 416/95 |
| 7,487,673 B2 * | 2/2009 | Ormel et al. | ............... | 73/170.07 |
| 7,628,359 B2 * | 12/2009 | Shah et al. | ............... | 244/134 R |
| 7,637,715 B2 * | 12/2009 | Battisti | ........................ | 415/115 |
| 7,708,524 B2 * | 5/2010 | Sundermann et al. | ......... | 416/39 |
| 2007/0154310 A1 | 7/2007 | Wobben | | |

FOREIGN PATENT DOCUMENTS

JP    2006528307 A    12/2006

* cited by examiner

*Primary Examiner* — Nicholas Ponomarenko
(74) *Attorney, Agent, or Firm* — Kanesaka Berner & Partners LLP

(57) ABSTRACT

An object of the invention is to reduce stop time of a wind turbine generator caused by icing on a wind turbine blade in the wind turbine generator. The invention provides the wind turbine generator including an ice detecting unit for detecting an amount of icing on a wind turbine blade, wherein an operation mode is switched to a no-load operation mode with no power being generated in a case where the icing amount detected by the ice detecting unit exceeds a first predetermined value, and an icing amount is detected by the ice detecting unit in a state where the apparatus is operated in the no-load operation mode.

11 Claims, 3 Drawing Sheets

WIND TURBINE GENERATOR AND METHOD OF CONTROLLING THE SAME

RELATED APPLICATIONS

The present application is a national phase of, and claims priority from, International Application Number PCT/JP2009/061727, filed Jun. 26, 2009, the disclosure of which is hereby incorporated by reference herein in its entirety.

TECHNICAL FIELD

The present invention relates to a wind turbine generator and a method of controlling the same.

BACKGROUND ART

Conventionally, there is known a wind turbine generator for generating power by using a force of wind as natural energy. In such a wind turbine generator, as the outside air temperature decreases, supercooled water droplets, moisture, or the like in the air collide with wind turbine blades and the like to be frozen, thereby causing icing on the wind turbine blades and the like. For example, Patent Citation 1 discloses a method of detecting icing on a wind turbine generator.
Patent Citation 1: U.S. Pat. No. 7,086,834

DISCLOSURE OF INVENTION

Icing tends to occur mostly in the front edge part of a wind turbine blade during operation. In such a case, even when a force of wind is applied to the wind turbine blade, a desired lift force is not generated. Consequently, the wind turbine blade does not rotate and desired operation cannot be performed.

However, conventionally, in a case where icing occurs before start of a wind turbine generator, the apparatus does not operate regardless of the degree of icing. It takes time to start the wind turbine generator and there is a problem that the work rate of the wind turbine generator decreases.

The present invention is achieved to solve the above problem, and it is an object thereof to provide a wind turbine generator reducing stop time of the wind power turbine generator due to icing on wind turbine blades, as well as a method of controlling the same.

A first mode of the present invention relates to a wind turbine generator including: ice detecting means for detecting an amount of icing on a wind turbine blade, wherein in a case where the icing amount detected by the ice detecting means exceeds a first predetermined value, an operation mode is switched to a no-load operation mode with no power being generated, and an icing amount is detected by the ice detecting means in a state where the apparatus is operated in the no-load operation mode.

With such a configuration, in the case where the amount of icing on the wind turbine blade detected by the ice detecting means exceeds the first predetermined value, the operation mode is switched to the no-load operation mode. In the state where the apparatus is operated in the no-load operation mode, an icing amount is detected.

Hitherto, in a case where icing occurs, the operation is immediately stopped. For example, when the stop period continues for a long period, devices in the wind turbine are cooled, so that a problem occurs that it takes considerably long time to restart the apparatus. On the contrary, in the present invention, even when icing is detected, the operation is continued in the no-load operation mode as described above. Therefore, warm-up can be continuously performed. For example, in a case where the icing amount decreases during the no-load operation mode and the operation is then restarted, the operation can be restarted from a state where the devices are warmed. Thus, the time required for operation restart can be shortened.

In a case where an icing amount exceeding a second predetermined value which is larger than the first predetermined value is detected by the ice detecting means in the state where the wind turbine generator is operated in the no-load operation mode, the operation is preferably stopped.

With such a configuration, in the case where the icing amount is larger than the first predetermined value and is equal to or less than the second predetermined value, the operation is performed in the no-load operation mode. When the icing amount exceeds the second predetermined value, the operation is stopped. For example, in a case where a threshold as an icing amount which affects the operation of the wind turbine generator is set as the second predetermined value, the operation in the no-load operation mode can be continuously performed as long as the operation of the wind turbine generator is not affected. The opportunity of restarting the operation from the warm-up state can be increased.

In a case where an icing amount below a third predetermined value which is set to be equal to or less than the first predetermined value is detected by the icing amount detecting means in the state where the wind turbine generator is operated in the no-load operation mode, the operation mode is may be switched to a normal operation mode.

As described above, in the case where the icing amount is below the third predetermined value which is set to be equal to or less than the first predetermined value in the state where the apparatus is operated in the no-load operation mode, the mode is switched from the no-load operation mode to the normal operation mode. Even in the case where the icing amount becomes larger than the first predetermined value once, the mode is reset to the normal operation upon decrease in the icing amount. Therefore, decrease in work rate of the wind turbine generator can be prevented. By providing with a hysteresis each of the condition for switching the mode from the normal operation to the no-load operation and the condition for switching the mode from the no-load operation to the normal operation, operation control can be stabilized.

A rotational speed of a wind turbine rotor may be set so that ice adhering to a wind turbine blade does not reach an adjacent wind turbine generator when the wind turbine rotor is rotated in the no-load operation mode of the wind turbine generator.

As described above, in the no-load operation mode, the rotational speed of the wind turbine rotor is set so that ice adhering to the wind turbine blade does not reach a wind turbine generator in the neighborhood. It can prevent influence on the neighborhood of the flying ice which adheres to the wind turbine blade.

The ice detecting means of the wind turbine generator may detect the icing amount based on a physical property of the wind turbine blade.

With the configuration, the icing amount can be calculated by applying an existing apparatus. The physical property is, for example, a distortion or the like.

In a case where the ice detecting means of the wind turbine generator cannot detect the icing amount in an operation stop state, preferably, the operation mode is switched to the no-load operation mode after lapse of a predetermined period since a stop of an operation of a wind turbine, and the icing amount is detected by the ice detecting means in a state where the apparatus is operated in the no-load operation mode.

Since the operation starts in the no-load operation mode after lapse of predetermined time from the operation stop state and the icing state is detected during operation in the no-load operation mode, the operation stop time can be reduced in comparison to a case of restarting the apparatus after visually recognizing icing as in the conventional method.

A second mode of the present invention relates to a method of controlling a wind turbine generator, including the steps of: detecting an amount of icing on a wind turbine blade; switching an operation mode to a no-load operation mode as an operation state with no power being generated in a case where the icing amount exceeds a first predetermined value; and detecting an icing amount in the state where the apparatus is operated in the no-load operation mode.

According to the present invention, there is exerted an effect of reducing stop time of the wind turbine generator due to icing on a wind turbine blade.

EXPLANATION OF REFERENCES

Figure 1:
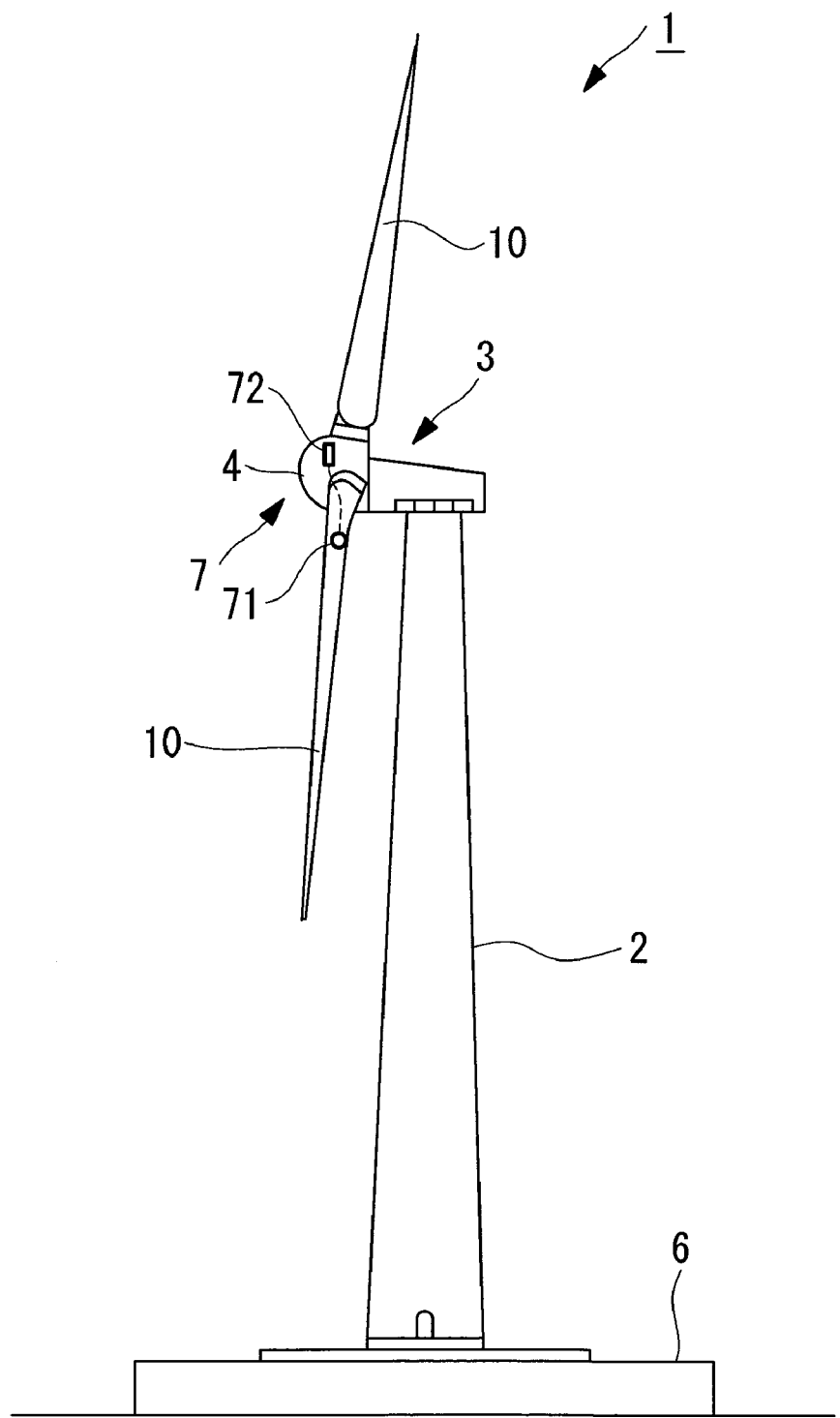
FIG. 1 Diagram showing a schematic configuration of a wind turbine generator according to an embodiment of the present invention.

1: wind turbine generator
4: rotor head
7: ice detecting unit (ice detecting means)
10: wind turbine blade
71: sensing unit
72: signal processing unit
73: signal receiving unit
74: icing amount calculating unit
75: operation mode switching unit

BEST MODE FOR CARRYING OUT THE INVENTION

An embodiment of a wind turbine generator according to the present invention will be described below with reference to the drawings.

FIG. 1 is a schematic diagram showing a schematic configuration of a wind turbine generator 1 according to the present embodiment.

As shown in FIG. 1, the wind turbine generator 1 includes a support 2, a nacelle 3 provided on the upper end of the support 2, and a rotor head 4 provided to the nacelle 3 so as to be rotatable about an almost horizontal axis. To the rotor head 4, three wind turbine blades 10 are radially attached about the rotational axis of the rotor head 4. With the configuration, a force of wind hitting the wind turbine blade 10 from the rotational axis direction of the rotor head 4 is converted to power for rotating the rotor head 4 about the rotational axis, and this power is converted to electric energy by a generator provided to the wind turbine generator 1.

The wind turbine generator 1 also includes an ice detecting unit (ice detecting means) 7 for detecting an amount of icing on each of the wind turbine blades 10. In the present embodiment, the ice detecting unit 7 detects an amount of icing on each of the wind turbine blades 10 in a state where the rotor head 4 is rotating, and has a sensing unit 71 and a signal processing unit 72.

The sensing unit 71 is provided to each of the wind turbine blades 10, to detect a distortion in the wind turbine blade 10 and output the detected distortion to the signal processing unit 72. The signal processing unit 72 is provided inside the rotor head 4 or the like, to receive a detection result in the sensing unit 71 and calculate an amount of icing on each of the wind turbine blades 10 from the detection result.

The sensing unit 71 and the signal processing unit 72 are known devices for measuring a load on the wind turbine blade 10. For example, as the sensing unit 71, an FBG (Fiber Bragg Grating) sensor can be employed. The FBG sensor reads a change in grating spacing of a Bragg grating caused by a distortion or heat based on a wavelength change in reflection light. Since the technique of calculating a distortion by the sensing unit 71 (FBG) and the signal processing unit 72 is known (for example, manufactured by insensys Limited, serial number WIND-SPEC-006-5), detailed description on a method of detecting a distortion or the like by using these units will not be provided herein.

Figure 2:
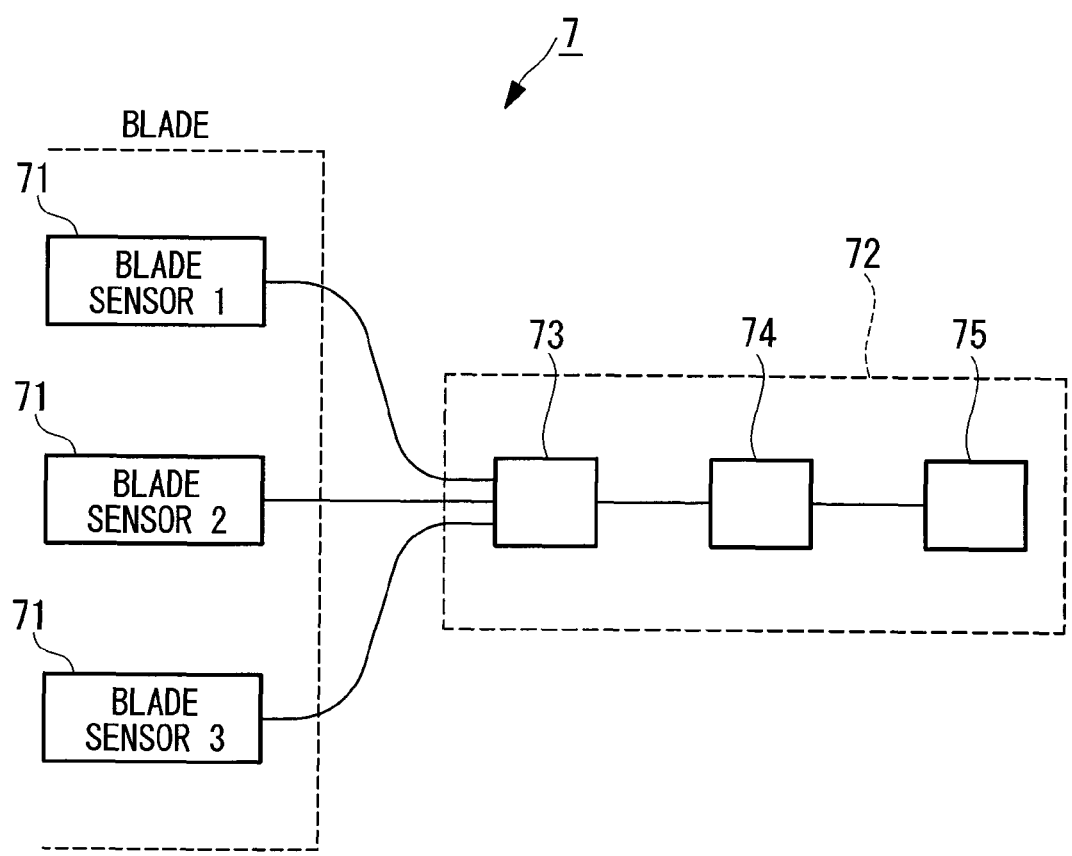
FIG. 2 Functional block diagram showing an example of an ice detecting unit.

More concretely, as shown in FIG. 2, the signal processing unit 72 has a signal receiving unit 73, an icing amount calculating unit 74, and an operation mode switching unit 75.

The signal receiving unit 73 periodically transmits light to the sensing unit 71 and detects a wavelength change from reflection light thereof. The signal receiving unit 73 outputs information on the detected wavelength to the icing amount calculating unit 74.

The icing amount calculating unit 74 calculates an amount of icing on the wind turbine blade 10 based on the information on the wavelength obtained from the signal receiving unit 73. For example, the icing amount calculating unit 74 calculates a distortion based on the obtained wavelength, calculates a bending moment of the wind turbine blade 10 based on the distortion value, and calculates an icing amount based on the calculated bending moment.

The icing amount calculating unit 74 is provided with a plurality of thresholds in correspondence with icing amounts, to determine whether or not the icing amount exceeds a threshold and output the determination result to the operation mode switching unit 75.

The determination made by the icing amount calculating unit 74 is performed on each of the three wind turbine blades 10.

The operation mode switching unit 75 switches the operation mode based on the determination result of the icing amount calculating unit 74. It is preferable to switch the operation mode in a case where the amount of icing on at least one wind turbine blade 10 exceeds the corresponding threshold.

The thresholds denote a first predetermined value set for an amount of icing on at least one wind turbine blade 10, a second predetermined value larger than the first predetermined value, and the like. In the present embodiment, as a third predetermined value, a value equal to the first predetermined value is used.

More concretely, in a case where the amount of icing on at least one wind turbine blade 10 is determined to exceed the first predetermined value, the operation mode switching unit 75 switches the operation mode of the wind turbine generator 1 to a no-load operation mode. The no-load operation mode is, for example, a no-power-generation operation (no-load) state. Preferably, the first predetermined value is set to, for example, an icing amount such that icing is detected but it is unnecessary to stop the operation.

In a case where the icing amount calculating unit 74 determines that the amount of icing on at least one wind turbine blade 10 is equal to or less than the first predetermined value during operation in the no-load operation mode, the operation mode switching unit 75 switches the operation mode of the wind turbine generator 1 to a normal operation mode.

In a case where the icing amount calculating unit 74 determines that the amount of icing on at least one wind turbine blade 10 exceeds the second predetermined value during operation in the no-load operation mode, the operation mode switching unit 75 stops the operation of the wind turbine generator 1. Concretely, the second predetermined value is set to a value larger than the first predetermined value. Preferably, the icing amount which affects the operation of the wind turbine generator 1 is set as the second predetermined value. The icing amount which affects the operation is a value of an icing amount at which a trouble occurs in the operation of the wind turbine generator 1, such as in a case where a stress on a lower part of the support 2 is larger than a predetermined value, in a case where the load exceeds an allowable level for a bearing, a speed-up gear, or the like.

By separately providing the threshold of the icing amount at which the operation of the wind turbine generator 1 is stopped, in a range where the icing amount is larger than the first predetermined value and equal to or less than the second predetermined value, the icing state can be monitored by the operation in the no-load operation mode. When icing decreases, the operation mode can be promptly switched to the normal operation mode.

In a case of starting the operation from a state where the wind turbine blade 10 is stopped, the wind turbine generator 1 is switched to the no-load operation mode, and determination of the thresholds similar to the above is performed. In a case where the icing amount is recognized to be larger than the second predetermined value and the operation of the wind turbine generator 1 is thus stopped, the icing amount is detected at predetermined time intervals. In a case where the icing amount is recognized to be equal to or less than the second predetermined value, the no-load operation mode is restarted. The sensing unit 71 employed in the present embodiment cannot detect the icing amount in a state where rotation of the rotor stops. Therefore, in a case where the operation of the wind turbine generator 1 is stopped, the rotor is rotated at predetermined time intervals, and the icing amount is detected in this state.

In the no-load operation mode, the rotational speed of the wind turbine rotor is set to a rotation speed at which a distance of ice adhering to the wind turbine blade 10 flies during rotation of the wind turbine rotor is smaller than a distance of the ice reaching another peripheral wind turbine generator 1. More concretely, the speed of the wind turbine blade 10 at a certain rotational speed (for example, a low rotational speed due to a no-power-generating operation state being set) is calculated, and the rotational speed is set so that the distance of ice which adheres to the front edge part flying at the calculated speed is equal to or less than a distance to the wind turbine generator 1 which is mounted in the neighborhood. For example, when the interval between two wind turbines is 190 meters, the rotational speed of the rotor 4 is controlled to be 1 rpm to 6 rpm.

Next, the action of the wind turbine generator 1 according to the present embodiment in a case where icing is detected during operation and that in a case where the apparatus is started from the operation stop state will be described in order.

Figure 3:
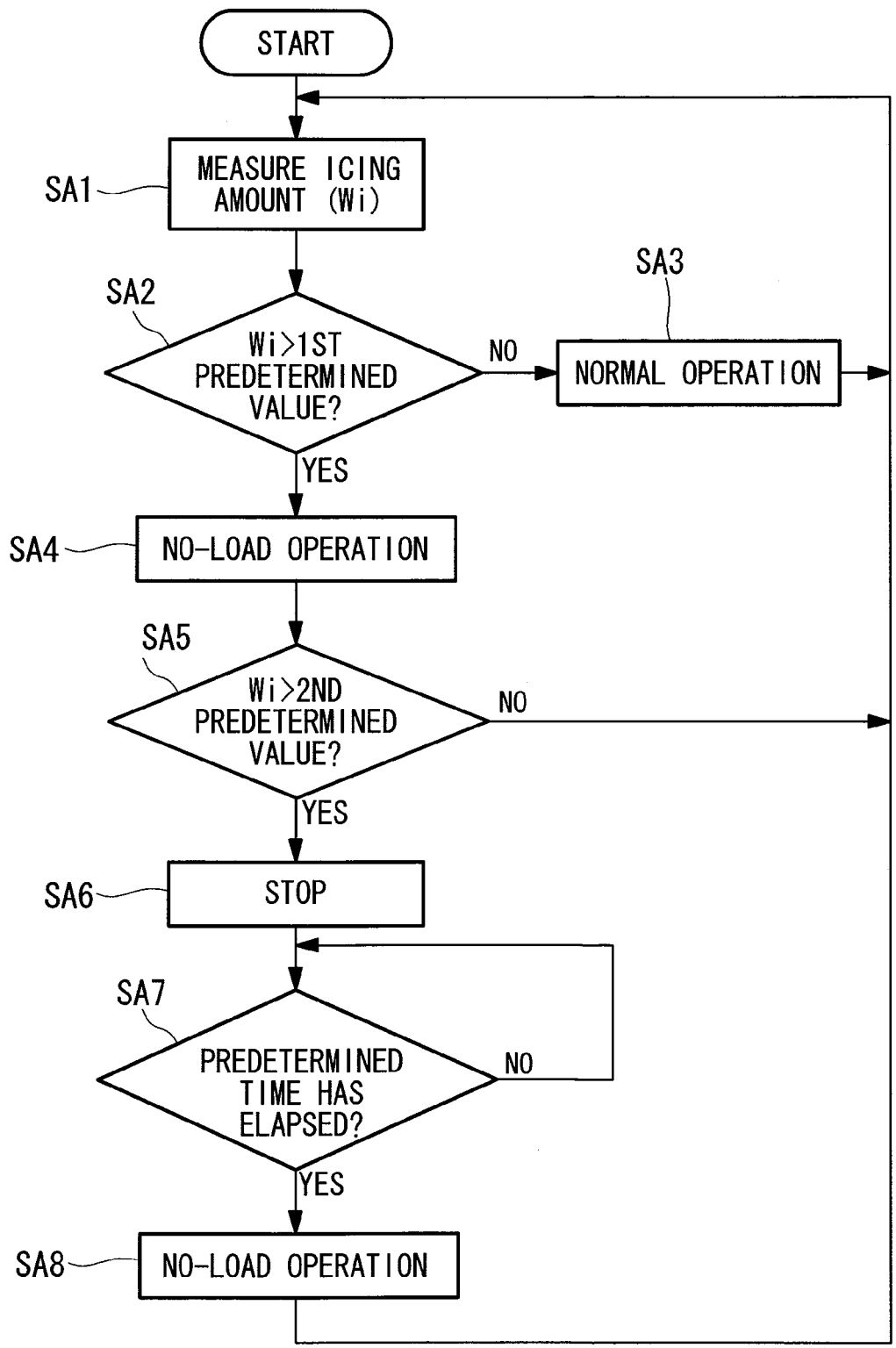
FIG. 3 Operation flow showing changes in operation states of the wind turbine generator according to the embodiment of the present invention.

First, the case where icing is detected during operation of the wind turbine generator 1 will be described with reference to FIG. 3.

In the case where the wind turbine generator 1 is being operated, a distortion is measured by the sensing unit 71 and the signal receiving unit 73 in the ice detecting unit 7 (step SA1), and the measurement result is outputted to the icing amount calculating unit 74. The icing amount calculating unit 74 calculates an amount Wi of icing adhering to the wind turbine blade 10 based on the measured distortion, and periodically determines whether or not the icing amount Wi exceeds the first predetermined value, and the operation mode switching unit 75 switches the operation mode (step SA2).

In a case where the icing amount Wi does not exceed the first predetermined value, the operation mode of the wind turbine generator 1 is set to the "normal operation" mode. In a case where the icing amount Wi is determined to exceed the first predetermined value, the operation mode switching unit 75 switches the operation mode of the wind turbine generator 1 to the "no-load operation" mode (step SA4).

In a case where the apparatus is operating in the no-load operation mode, whether or not the icing amount Wi exceeds the second predetermined value is periodically determined (step SA5). In a case where the icing amount Wi exceeds the second predetermined value, the icing amount Wi is regarded as having increased, so that the operation of the wind turbine generator 1 is stopped (step SA6). In a case where the icing amount Wi does not exceed the second predetermined value, the apparatus returns to step SA1 and continues measurement of the icing amount Wi.

Subsequently, the case where the wind turbine generator 1 starts from the stop state will be described with reference to FIG. 3.

Determined is whether or not predetermined time (for example, one hour) has elapsed since the wind turbine generator 1 was stopped due to the icing amount Wi exceeding the second predetermined value (step SA7). In a case where the predetermined time is determined to have elapsed, the operation is started in the "no-load operation" mode (step SA8), the apparatus returns to step SA1 and continues measurement of the icing amount Wi. In a case where the predetermined time has not elapsed, the determination of whether or not the predetermined time has elapsed is repeated (step SA7).

As described above, in the wind turbine generator 1 and the method of controlling the same according to the present embodiment, the amount of icing adhering to the wind turbine blade 10 is calculated based on the distortion measured on the wind turbine blade 10, and whether or not the icing amount exceeds the first predetermined value is determined. When the icing amount exceeds the first predetermined value, the operation mode is switched to the no-load operation mode. Further, depending on whether the icing amount exceeds the second predetermined value or is less than the first predetermined value in the no-load operation mode, the operation mode is switched.

As described above, in the present embodiment, in a case where icing is detected, the operation is not immediately stopped. Instead, a period of operating the apparatus in the no-load operation mode is provided. According to the icing state in the no-load operation mode operation, it is determined to stop the operation or to switch the operation mode to the normal operation mode. For example, when the icing amount decreases and becomes below the first predetermined value, the apparatus can be promptly switched from the no-load operation mode to the normal operation mode. Thus, the operation rate of the wind turbine generator 1 can be improved.

In the present embodiment, the icing amount is detected during rotation of the rotor head 4. However, the present invention is not limited to the present embodiment. For example, there may be also used a method of detecting the icing amount even in a state where the rotor head 4 is not rotating. In this case, the process of operating by switching from the operation stop state to the no-load operation mode in order to detect the icing amount can be made unnecessary.

In the present embodiment, the third predetermined value is made equal to the first predetermined value. However, the present invention is not limited to the above. For example, the third predetermined value may be smaller than the first predetermined value.

The invention claimed is:

1. A wind turbine generator comprising:
    a wind turbine rotor having one or more wind turbine blades;
    an icing amount detecting unit configured to detect an icing amount on at least one wind turbine blade when the wind turbine rotor is rotating; and
    an operation mode switching unit configured to switch an operation mode of the wind turbine generator to any one of a normal operation mode in which the wind turbine rotor is rotated and power is generated, a no-load operation mode in which the wind turbine rotor is rotated but no power is generated, and an operation stop state in which the wind turbine rotor is stopped;
    wherein
    the operation mode switching unit switches the operation mode to the no-load operation mode if the icing amount detected by the icing amount detecting unit exceeds a first predetermined value and operation mode is the normal operation mode; and
    the icing amount detecting unit detects the icing amount when the operation mode is the no-load operation mode.

2. The wind turbine generator according to claim 1, wherein the operation mode switching unit switches the operation mode to the operation stop state if the icing amount detected by the icing amount detecting unit exceeds a second predetermined value which is larger than the first predetermined value and the operation mode is the no-load operation mode.

3. The wind turbine generator according to claim 1, wherein the operation mode switching unit switches the operation mode to the normal operation mode if the icing amount detected by the icing amount detecting unit falls below a third predetermined value which is set to be equal to or less than the first predetermined value and the operation mode is the no-load operation mode.

4. The wind turbine generator according to claim 1, wherein a rotational speed of the wind turbine rotor is set so that ice adhering to the wind turbine blade does not reach an adjacent wind turbine generator when the wind turbine rotor is rotated in the no-load operation mode.

5. The wind turbine generator according to claim 1, wherein the icing amount detecting unit detects the icing amount based on a distortion of the wind turbine blade.

6. The wind turbine generator according to claim 1, wherein
    the operation mode switching unit switches the operation mode to the no-load operation mode after lapse of a predetermined period since the operation mode is switched to the operation stop state if the icing amount detecting unit cannot detect the icing amount, the operation mode is the operation stop state, and the wind turbine rotor is not rotated; and
    the icing amount detecting unit detects the icing amount when the operation mode is the no-load operation mode.

7. A method of controlling a wind turbine generator, comprising steps of:
    detecting an icing amount on a wind turbine blade when a wind turbine rotor is rotating;
    switching an operation mode of the wind turbine generator to a no-load operation mode in which the wind turbine rotor is rotated but no power is generated if the icing amount exceeds a first predetermined value; and
    detecting the icing amount when the operation mode is the no-load operation mode.

8. A method of controlling a wind turbine generator, comprising steps of:
    detecting an icing amount on a wind turbine blade when a wind turbine rotor is rotating;
    switching an operation mode of the wind turbine generator to any one of a normal operation mode in which the wind turbine rotor is rotated and power is generated, a no-load operation mode in which the wind turbine rotor is rotated but no power is generated, and an operation stop state in which the wind turbine rotor is stopped;
    wherein
    switching the operation mode to the no-load operation mode if the icing amount detected by the icing amount detecting unit exceeds a first predetermined value and operation mode is the normal operation mode; and
    detecting the icing amount when the operation mode is the no-load operation mode.

9. The method of controlling a wind turbine generator according to claim 8, further comprising the steps of:
    switching the operation mode to the operation stop state if the icing amount detected by the icing amount detecting unit exceeds a second predetermined value which is larger than the first predetermined value and the operation mode is the no-load operation mode.

10. The method of controlling a wind turbine generator according to claim 8, further comprising the steps of:
    switching the operation mode to the normal operation mode if the icing amount detected by the icing amount detecting unit falls below a third predetermined value which is set to be equal to or less than the first predetermined value and the operation mode is the no-load operation mode.

11. The method of controlling a wind turbine generator according to claim 8, further comprising the steps of:
    switching the operation mode to the no-load operation mode after lapse of a predetermined period since the operation mode is switched to the operation stop state if the icing amount detecting unit cannot detect the icing amount, the operation mode is the operation stop state, and the wind turbine rotor is not rotated; and
    detecting the icing amount when the operation mode is the no-load operation mode.

* * * * *